(No Model.)

J. DAVIDSON.
GRATER FOR CULINARY PURPOSES.

No. 528,416. Patented Oct. 30, 1894.

WITNESSES.

INVENTOR.

ATTORNEY.

UNITED STATES PATENT OFFICE.

JOHN DAVIDSON, OF WICK, SCOTLAND.

GRATER FOR CULINARY PURPOSES.

SPECIFICATION forming part of Letters Patent No. 528,416, dated October 30, 1894.

Application filed April 16, 1894. Serial No. 507,746. (No model.)

*To all whom it may concern:*

Be it known that I, JOHN DAVIDSON, watchmaker, a subject of the Queen of Great Britain, residing at High Street, Wick, in the county of Caithness, Scotland, have invented a new and useful Improved Grater for Culinary Purposes, of which the following is a specification.

The object of my invention is an improved grater for culinary purposes generally of such a construction that one of the grating surfaces acts also as a sieve through which the particles have to pass before escaping, thus insuring a uniformity of size.

My improved grater is practically constructed of a metal cylindrical vessel open at both ends and of any desirable height and diameter, into the lower end of which fits a short tube having its lower edge flanged to prevent it sliding too far into the cylindrical vessel while over its upper end is stretched wire gauze either flat or bent so that its upper side presents a concave surface. Across the upper surface of said gauze is secured a metal bar or wire to prevent the material to be grated revolving with the grater proper, and in the center of this bar or wire a projection is formed in or attached to prevent said grater coming in direct contact with the gauze or bar. Across the upper end of the cylindrical vessel are secured two stays, in holes or bearings in the centers of which a vertical spindle revolves and slides longitudinally. The upper end of this spindle is provided with a suitably cranked handle while secured to its lower end is a disk of wood or other suitable material loosely fitting the cylindrical vessel and over the lower face of which fits the grater proper in the form of a metal plate, with a flat or convex lower surface, punched in a similar manner to the ordinary nutmeg grater and which may be either tacked on or flanged to enable it to fit on to said disk. The material to be grated is placed in the cylindrical vessel beneath the grater proper through an opening having a sliding or other suitable door in the side of the former, the spindle on which said grater is fixed being then forced downward and revolved. The cylindrical vessel may be provided with a suitable handle by means of which it may be held during the grating operation.

In order that my invention may be more fully understood and carried into practice, I will now proceed to describe the same with reference to the accompanying drawings, of which—

Figure 1:
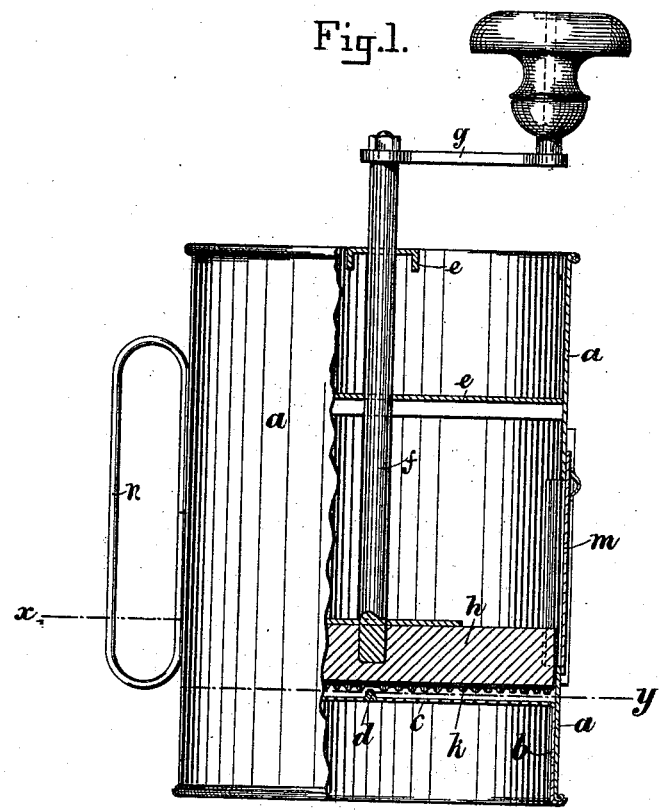
Figure 2:
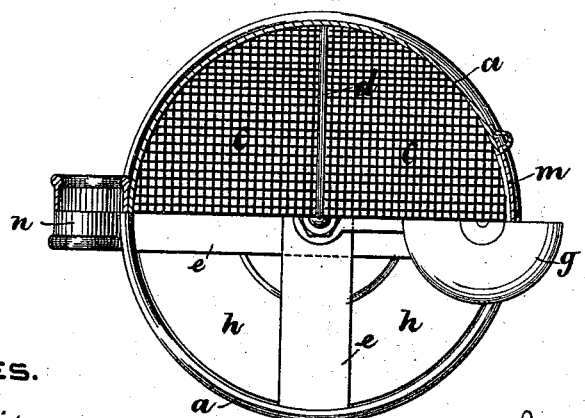

Figure 1 is a part sectional elevation, and Fig. 2 a plan, half sectional on line $x$—$y$ Fig. 1 of a grater constructed according to my invention.

The cylindrical vessel $a$ has fitting into its lower end a short tube $b$ flanged at its lower end to prevent it sliding too far into the vessel $a$ and having wire gauze $c$ stretched across its upper end so that the upper side of said gauze presents a flat or concave surface. A metal bar or wire $d$ is secured across the upper surface of this gauze $c$ to prevent the material being grated revolving with the grater proper, while a loop or projection is formed in or attached to the middle of said wire to prevent the grater coming directly in contact with the gauze or bar.

Across the upper end of the cylindrical vessel $a$ are secured two stays $e$ in holes or bearings in the centers of which a vertical spindle $f$ revolves and slides longitudinally. The upper end of this spindle is provided with a suitable handle $g$ while secured to its lower end is a disk $h$ of wood or other suitable material loosely fitting the vessel $a$ and over the lower part of which fits the grater proper $k$ in the form of a metal plate with a flat or convex lower surface, punched in a similar manner to the ordinary nutmeg grater and which may be either tacked on or flanged to enable it to fit on to said disk $h$.

An opening is formed in the side of the vessel $a$ and provided with a sliding or other suitable door $m$ to enable the material to be grated to be placed between the grater $k$, which may be raised for the purpose, and the gauze sieve $c$, while at the opposite side of the vessel $a$ a suitable handle $n$ is provided.

What I claim is—

1. In a grater, the combination of the body, a revolving and longitudinally movable grating disk, an opposing sieve close to its surface and on the side toward the said grating disk, and a bar extending transversely across the sieve, substantially as and for the purpose set forth.

2. In a grater, the combination of the two opposing grating surfaces, and a projection adjacent to one of the grating surfaces which prevents them coming too close together substantially as and for the purpose set forth.

JOHN DAVIDSON.

Witnesses:
FREDK. J. BINGHAM,
T. F. BARNES.